July 8, 1941.  H. K. WILDER  2,248,292
PROCESS FOR MAKING CEREAL FOOD
Filed Aug. 5, 1939
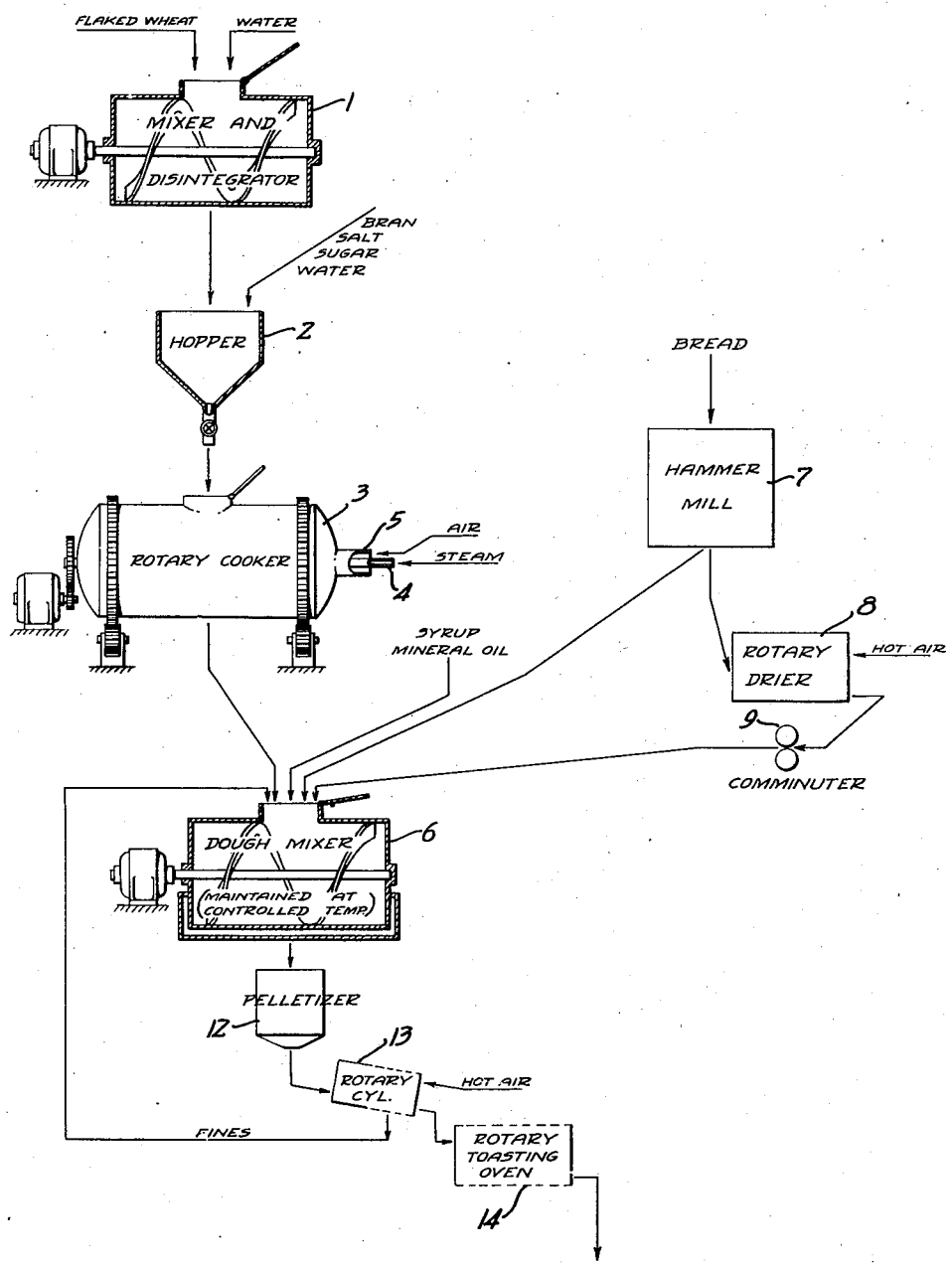
INVENTOR
HAROLD K. WILDER
BY Boyken & Mohler
ATTORNEY Patented July 8, 1941

2,248,292

UNITED STATES PATENT OFFICE 2,248,292

PROCESS FOR MAKING CEREAL FOOD

Harold K. Wilder, Palo Alto, Calif., assignor to Stanley S. Langendorf, San Francisco, Calif.

Application August 5, 1939, Serial No. 288,619

6 Claims. (Cl. 99—83)

This invention relates in general to a process for preparing a cereal food comprising discrete particles of baked seasoned dough having a porous and friable or crunchy texture.

As a result of considerable development work I have found that in order to make baked dough particles porous and friable, they must have incorporated in them some dried comminuted material and be formed under predetermined temperature and viscosity conditions.

In general, the object of this invention is the provision of a process of making a cereal food of discrete particles of baked dough wherein the desired porous and friable texture of such particles is obtained by the incorporation of dried, comminuted bread in the dough from which such particles are formed.

Another object of the invention is the formation of said particles under pressure and in the presence of an edible lubricant.

Still another object of the invention is the use of a controlled temperature during the formation of said particles.

Further objects and advantages of the invention will appear in the following description of the preferred embodiment of my process. It should however be understood that I do not intend to limit myself to the details as so described and as shown in the annexed drawing, since my process as defined in the claims appended hereto may be carried out in a number of equivalent ways.

In the drawing annexed hereto and forming part of this specification, a flow diagram of the preferred manner of carrying out my process is shown.

In general, my process comprises the preparation of a dough formed by suitably cooking an intimate seasoned mixture of flaked grain and bran in the presence of water, adding to such dough at least an equivalent quantity of dried comminuted bread, forming discrete particles of the resulting bread mixture in the presence of an edible lubricant such as mineral oil and under controlled temperature conditions, and then baking such particles to a point where they become friable or crunchy. The product so obtained is described more in detail in my co-pending application, Serial No. 288,618, filed August 5, 1939.

More specifically, and as diagrammatically indicated in the drawing, 10 pounds of flaked wheat are thoroughly mixed and disintegrated with 3 pounds of water in a rotary mixer 1. The disintegrated flaked wheat is then dumped into a hopper 2 together with 100 pounds of bran, 45 pounds of sugar, 2 pounds of salt, and 15 pounds of water. From the hopper the seasoned mixture is introduced into a rotary cooker 3, where it is cooked for a period of approximately 30 minutes under a steam pressure of approximately 15 pounds gauge. The required steam may be introduced through an intake 4 and after the cooking operation has been completed the resulting dough may be partially cooled and dehydrated to a moisture content of from about 20% to 35% (dry solid basis) by passing air through the cooker by an air exhaust 5.

40 pounds of this partially dehydrated dough are thoroughly mixed in a water-jacketed dough mixer 6 with 2½ pounds of malt or other syrup, 3 pounds of mineral oil, and 75 pounds of bread which has been ground in a hammer mill 7 to pass through a 2-mesh screen. The bread used for this purpose is preferably stale although not otherwise dried. Another portion of the bread as discharged from the mill 7, is dried in a rotary drier 8 to a moisture content of from about 2% to 20% (dry solid basis) and passed through a comminutor 9, which reduces the product to a size that will pass through a 4-mesh screen.

Approximately 20 pounds of this dried and ground bread are then introduced into the dough mixer 6 and thoroughly mixed with the seasoned dough which has already been incorporated with the ground stale bread. It is quite feasible to add both the undried and dried ground bread to the mix simultaneously or to add all of the bread content in the form of ground dried bread, but I have found that by first adding and mixing the ground undried bread and then adding and mixing the ground dried bread, the final product will have a more pleasing texture.

The mineral oil is added as a lubricant to aid in the subsequent formation of discrete dough particles or pellets of suitable texture, and for the same reason the viscosity of the mix is controlled by maintaining the mixer 6 under a controlled temperature of from about 50° to 120° F. For this purpose the mixer 6 is provided with an insulated water jacket through which fluid at a suitable temperature may be circulated.

After the dough in the mixer 6 has been thoroughly incorporated with the comminuted bread and other ingredients, it is formed into pellets or discrete particles by passing it through a pelletizer 12. These particles should preferably be anywhere from about ⅛" to ¼" in diameter, although they are by no means regular in size or shape. The pelletizer 12 may be of the extruding type having a rotary worm for propelling the dough under pressure against a perforated plate. The dough passes through the plate under considerable pressure and emerges in the form of spaghetti which is then cut into small pieces by a rotary knife revolving against the perforated plate. Although it is essential that the pressure developed during the formation of the dough particles or pellets be such that the material forming each pellet will adhere together to form compact units, care must be taken not to use too great a pressure, for otherwise the resulting pellets will not have the desired friable and crunchy texture. In order to relieve the pressure somewhat, the orifices in the plate through which the dough is made to pass should be tapered so as to have a greater diameter at the outer face than at the inner face of the plate. I have found that the maximum pressure permissible in forming the pellets is not sufficient to form all of the dough passing through the pelletizer into pellets and that some of the dough separates out in particles which are too small to be acceptable as a final product. These smaller particles must therefore be separated from the larger acceptable pellets by a separator between the pelletizer and oven, as hereinafter described.

Since the dough as extruded is rather moist, the fines have a tendency to adhere to the formed pellets and to overcome this tendency it is necessary to dry the extruded dough slightly prior to the separation of the fines from the pellets. For this purpose the extruded dough is passed through a downwardly sloping rotary cylinder 13, the exit end portion of which is perforated so as to permit the fines to pass through it. Hot air is passed through the rotary cylinder 13 and serves to dry the extruded dough sufficiently so that there will be very little adhesion between the fines and the pellets by the time that the material reaches the perforated section of the cylinder. Preferably the rotary cylinder is substantially as shown in my copending application, Serial No. 288,620, filed August 5, 1939, and is provided with flights for tumbling the dough particles and effecting a better heat exchange. For the size of the pellets or particles commonly manufactured, the perforations in the cylinder may be in the order of $7/64''$ in diameter. It is essential to pass hot air over the extruded dough not only for the purpose of decreasing the adherence between the fines and the pellets, but for the further purpose of partially baking the individual pellets so that these pellets will not be broken up during the subsequent toasting operation.

The fines from the rotary cylinder 13 are returned to the dough mixer 6 and the semi-dried pellets are passed through a rotary oven 14. In re-introducing the fine and semi-dried extruded dough into the dough mixture, these fines are preferably added to another batch of dough after the addition of the comminuted bread from the hammer mill 7. The toasting oven 14 may be in the form of a perforated cylinder provided on its interior with a continuous propelling worm causing the material to move through it. The extruded pellets are toasted in the toaster 14 at a temperature between 250° and 450° F. and for a period of about 6 to 12 minutes. During the toasting operation the product is converted from a rather soft but firm mass into a solid crisp and friable golden brown product suitable for eating dry or with cream and sugar as a ready-to-eat cereal food of the so-called "breakfast food" type.

The ratios of the quantities of ingredients used as above set forth are not critical, although it will be found that by following these ratios a very pleasing and tasty product can be produced.

Flaked wheat is used in preference to other flaked grain simply because of the resulting taste and texture.

Bran is used for the reason that the bran particles appear to serve best in combination with the comminuted bread particles to given the desired nutritional value and to aid in preventing the dough content of each pellet from unduly packing and forming a final product too hard to be easily crunched by the teeth. The best way of considering the product resulting from my process is that each individual pellet consists of crisp, dried bread particles bonded together by a dough, the major portion of which dough is undried comminuted bread. The comminuted bread is not introduced into the mix in advance of the mixer 6 for the reason that in subjecting the bread to the cooker 3 it would be rendered unsuitable for its intended function. It is also for this reason that the undried comminuted bread is preferably added to the mix prior to the introduction of the artificially dried bread.

Having described my invention, I claim:

1. The process of making a cereal food, comprising: cooking an intimate mixture of flaked grain, bran, ordinary baked bread and seasoning in the presence of water to form a dough; dehydrating said dough to a moisture content of from about 20% to 35%; forming discrete particles of said dough which has been mixed with an oily lubricant and comminuted dried bread; and then toasting said particles to a point where they become friable.

2. The process of making a cereal food, comprising: cooking an intimate mixture of flaked grain, bran, ordinary baked bread and seasoning in the presence of water and under substantially 15 pounds steam pressure for approximately 30 minutes in order to form a dough; dehydrating said dough to a moisture countent of from about 20% to 35%; forming discrete particles of said dough which has been mixed with dried comminuted bread and under a controlled temperature of from about 50° to 120° F., and then toasting said particles to a point where they become friable.

3. The process of making a cereal food, comprising: cooking an intimate mixture of flaked grain, bran, ordinary baked bread and seasoning in the presence of water and under substantially 15 pounds steam pressure for approximately 30 minutes in order to form a dough; dehydrating said dough to a moisture content of from about 20% to 35%; forming discrete particles of said dough which has been mixed with dried comminuted bread having a moisture content of from about 2% to 20% and under a controlled temperature of from about 50° to 120° F., and then toasting said particles to a point where they become friable.

4. The process of making a cereal food, comprising: preparing a seasoned dough of ordinary baked bread having a moisture content of from about 20% to 35%; forming pellets of said dough which has been mixed with substantially fully dried comminuted bread; and then toasting said pellets to a point where they become friable and crunchy.

5. The process of making a cereal food, comprising: preparing a seasoned dough made from baked bread having a moisture content of from about 20% to 35%; forming pellets of said dough which has been mixed with dried comminuted bread; and then toasting said pellets to a point where they become friable and crunchy.

6. The process of making a cereal food from bread that includes the steps of comminuting ordinary baked, raised, loaves of bread, adding an aqueous sugar solution to part of such comminuted bread to form a dough, removing the moisture from another part of said comminuted bread until relatively dry, bonding together the particles of bread so dried with the dough by thoroughly mixing the dough and partially dried bread, forming pellets of the mixture and thereafter toasting said pellets to the point where they become friable and crunchy.

HAROLD K. WILDER.